Nov. 25, 1958        H. RUF        2,861,313

KEY CHAIN CONSTRUCTION

Filed May 24, 1954

INVENTOR
Hermann Ruf
BY
Nathaniel Frucht
ATTORNEY

United States Patent Office 2,861,313
Patented Nov. 25, 1958

2,861,313

KEY CHAIN CONSTRUCTION

Hermann Ruf, Union, N. J., assignor, by mesne assignments, to Forstner, Inc., Irvington, N. J., a corporation of New Jersey Application May 24, 1954, Serial No. 431,817

1 Claim. (Cl. 24—115)

The present invention relates to the jewelry art, and has particular reference to key chains and the like.

The principal object of the invention is to provide an extensible key chain of novel construction.

Another object of the invention is to provide an extensible key chain which includes a novel friction slide.

With the above and other objects and advantageous features in view, the invention consists of a novel arrangement of parts more fully disclosed in the detailed description following, in conjunction with the accompanying drawings, and more specifically defined in the claim appended thereto.

Figure 1:
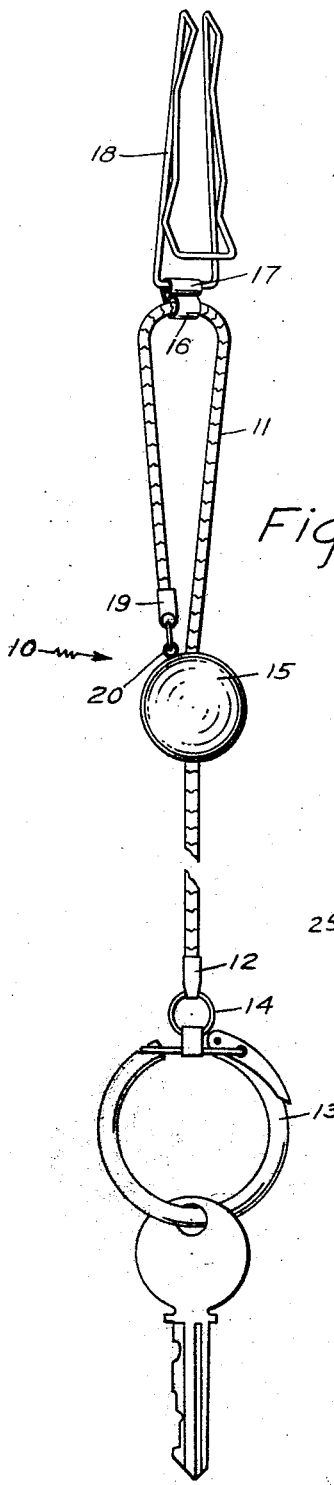
Fig. 1 is a plan view, partly broken away, of an illustrative construction for a key chain embodying the invention.

Extensible key chains are subject to continuous hard usage, and it has therefore been found desirable to provide an extensible key chain which includes a friction slide having long life. To this end, I provide a friction slide which utilizes two opposed spring members of special hardened material, whereby the slide does not erode or wear away and is not affected by adverse weather conditions or the like.

Referring to the drawings, the key chain 10 includes a length of ornamental chain 11 which has a ferrule 12 at one end to which a key holder 13 of standard type is connected, as by a standard jump ring 14. The chain 11 is passed through a slide 15 and through a turn tube 16 of a connector 17 to which a clip 18 is attached for hooking over the belt or the upper trouser edge; the other end of the chain has a ferrule 19 and is jump ring attached to a lock ring 20 on the slide 15.

Figure 2:
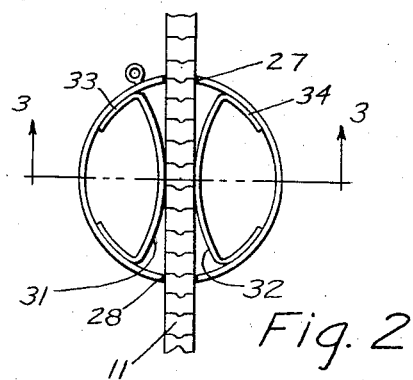
Fig. 2 is an enlarged vertical sectional detail through the slide.
Figure 3:
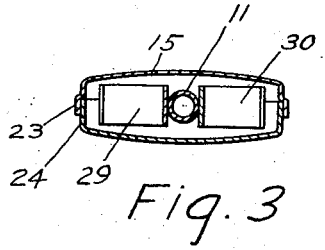
Fig. 3 is a section on the line 3—3 of Fig. 2.
Figures 4, 5:
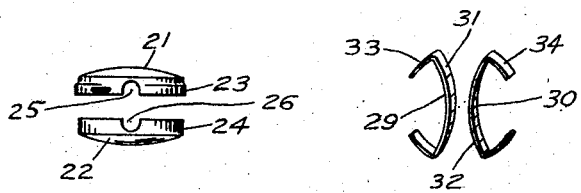
Fig. 4 is an exploded view showing the two half sections of the slide.
Fig. 5 is an exploded view of the associated springs for the slide.

As illustrated in Figs. 2 and 4, the slide 15 is hollow, and is formed of two cup shaped half sections 21, 22, the section 21 having an annular flanged rim 23 and the section 22 having an annular rim 24 which lock seats into flanged rim 23, the rims having U-shaped edge slots 25, 26 at diametrically opposite points thereof which align to provide diametrically opposite circular chain receiving openings 27, 28. The lock ring 20 is secured to or formed integral with the flanged rim 23 at a point contiguous the upper opening 27. Two flat springs 29, 30, having arcuate center portions 31, 32, and bent ends 33 and 34, are seated in the slide, as shown in Fig. 2, whereby the bent ends slidably bear against the inner surfaces of the cup-shaped section rims, and the arcuate center portions are positioned convexly to each other to resiliently contact the chain.

It is preferred to make the springs of hardened tempered steel, and to make the cup shaped half sections of polished metal whereby the slides and the chain present a very ornamental appearance.

Although I have disclosed a spring pressed all-metal slide of specific construction, it is obvious that the material, the size, the shape, and the arrangement of the parts may be changed to provide different key chain designs, without departing from the spirit or the scope of the invention as defined in the appended claim.

I claim:

A slide for an extensible key chain, having two cup-shaped sections with annular rims, said rims being lock seated together, whereby a hollow compartment with an annular wall is provided, the section rims having aligned diametrically opposite U-shaped slots providing circular openings for passage of a flexible chain therethrough, said compartment having two springs of flat stock with arcuate center portions in convexly opposed relation and bent-in ends conforming to and slidably engaging the inner surface of the compartment annular wall.

References Cited in the file of this patent

UNITED STATES PATENTS

| | | |
|---|---|---|
| 136,946 | Valentine | Mar. 18, 1873 |
| 707,241 | Knapp | Aug. 19, 1902 |
| 1,023,663 | Kubicek | Apr. 16, 1912 |
| 1,124,518 | Qvarnstrom | Jan. 12, 1915 |
| 1,280,237 | King | Oct. 1, 1918 |
| 1,605,595 | Lang | Nov. 2, 1926 |
| 1,891,947 | Powell | Dec. 27, 1932 |
| 2,090,860 | Bonat | Aug. 24, 1937 |
| 2,159,223 | Okun | May 23, 1939 |
| 2,296,084 | Bloom | Sept. 15, 1942 |

FOREIGN PATENTS

| | | |
|---|---|---|
| 10,706 | Great Britain | May 3, 1911 |
| 24,940 | Great Britain | Oct. 31, 1912 |
| 455,683 | France | Aug. 6, 1913 |